March 17. 1925.  W. G. BARLOW  1,529,828

BRAKE BAND

Filed Dec. 7, 1923

Inventor
William G. Barlow

By Herbert E. Smith
Attorney

Patented Mar. 17, 1925.

1,529,828

UNITED STATES PATENT OFFICE.

WILLIAM G. BARLOW, OF SPOKANE, WASHINGTON, ASSIGNOR TO BARLOW MANUFACTURING COMPANY, OF SPOKANE, WASHINGTON.

BRAKE BAND.

Application filed December 7, 1923. Serial No. 679,188.

*To all whom it may concern:*

Be it known that I, WILLIAM G. BARLOW, a citizen of the United States, residing at Spokane, Spokane County, and State of Washington, have invented certain new and useful Improvements in Brake Bands, of which the following is a specification.

My present invention relates to improvements in brake bands and is directed especially to bands of that type employing an exterior friction band to be compressed on a brake drum enclosed within an oil filled casing, as generally utilized for the transmission mechanism of the Ford type of automotive vehicles.

The primary object of my invention is the provision of an effective and durable device of this character which is comparatively inexpensive in cost of construction, and in which worn parts may be replaced or renewed if desired, with facility and minimum expenditure of labor.

The invention consists in certain novel features of construction and combinations and arrangements of the friction shoes in relation to the band whereby the former are securely anchored to the latter; means are provided for a close and effective frictional engagement between the shoes and the enclosed drum; and grit or other foreign substances are disposed of for the purpose of preventing undue wear between the shoes and drum, as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

Figure 1:
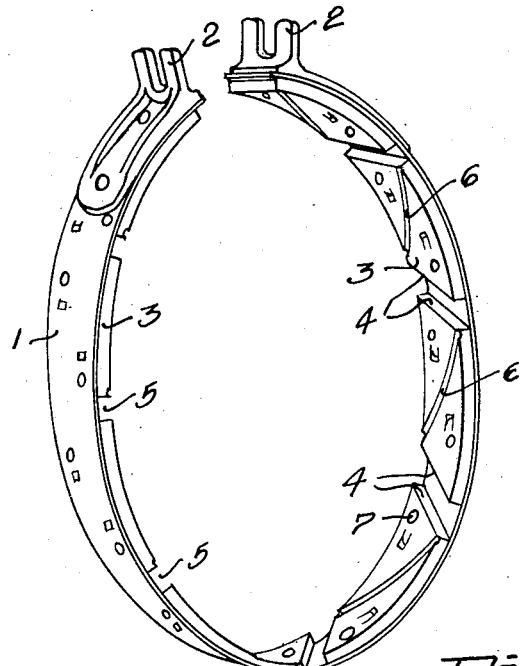
Figure 1 is a perspective view of a brake band or transmission band according to my invention, adapted for any one of several uses in connection with the transmission mechanism of automotive vehicles.
Figure 2:
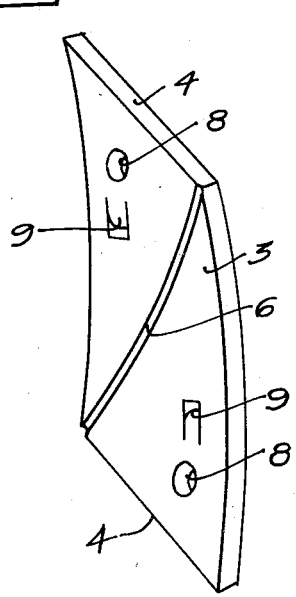
Figure 2 is an enlarged view in perspective of one of the brake shoes or friction shoes.

The friction band 1 is in the form of an open ring and is made up in various standard sizes, preferably of steel, and provided with bearings 2 2 at its free ends for the clutch shaft by means of which the band is compressed on the brake drum, not shown.

A suitable number of friction shoes or brake shoes 3 are arranged at regular intervals within the band and are composed of a fine grain metal as brass, which while tough to insure durability and prolong wear, is also sufficiently soft to insure a close frictional contact for braking purposes on the relatively harder brake drum, which is usually of steel.

The friction shoes are preferably of approximate diamond shape having two parallel sides which coincide with the lateral edges of the friction band 1, while their ends 4, 4, which are shorter than the sides, are arranged at an angle to the sides, but parallel with each other. The shoes are located at regular intervals within the band and disposed to form spaces 5 therebetween with the respective ends 4 extending tranversely of the band but at an angle to longitudinal axis of the drum.

By this angular disposition of the ends of the friction shoes it will be apparent that contact between the shoes and the brake drum or wheel is made in such manner as to prevent uneven or irregular wear on the end edges of the shoes and the shearing contact of the end of the shoe with the drum insures a gradual rather than a sudden frictional engagement resulting a smooth and uniform application of the shoe to the drum when the band is compressed.

As the friction members are encased in an oil bath it will be apparent that the spaces 5 permit the application to the friction members of an adequate supply of oil as a lubricant as required.

Across the friction shoes are angularly disposed grooves 6, one to each shoe and extending diagonally from one corner to another corner in the working face of the shoe. It will be apparent that these grooves permit the proper distribution of oil by circulating it across the shoe between the latter and the drum. These grooves also perform the function of carrying off any grit or other foreign matter and preventing accumulation on the frictional faces of such matters, the stream of oil passing through the groove from one side to another of the shoe aiding in disposing of the grit. In this manner the faces of the shoes are protected from scratching or marring and are maintained with a smooth and uniform exterior.

Figure 3:
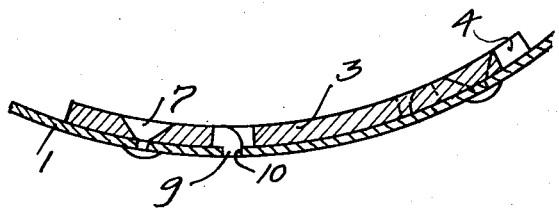
Figure 3 is a sectional view showing the relation between the shoes and the band to which they are attached.

The shoes are secured to the band by means of countersunk rivets 7 passing through openings 8 in the shoes, and additional means are provided for each shoe to assist in maintaining them in rigid position on the band. For this purpose I fashion on the shoes integral spurs 9 which are formed by suitable die machines or in any preferred manner for striking them from the metal of the shoes. The spurs project from the rear face of the shoe and are bent to lock into slots or openings 10 in the band 1 as seen in Figure 3. In this manner the spurs, which project in direction opposite to that of the strain imposed on the shoe when in frictional contact with the drum, take up the thrust of the energy absorbed by the frictional contact and relieve the rivets.

From the above description taken in connection with my drawings it will be apparent that I have provided a device of this character which fulfills the conditions and objects sets forth as the purpose of my invention, and insures a durable and effective brake band.

Having thus fully described my invention what I claim as new and desire to secure by Letters Patent is—

1. The combination with a brake band of spaced friction shoes of approximate diamond shape and having their ends disposed at an angle to the lateral edges of said band.

2. The combination with a brake band of spaced friction shoes each having a groove in its working face extending from side to side of the band and disposed at an angle to the edges of the band.

3. The combination with a brake band of spaced friction shoes of approximate diamond shape having their ends disposed at an angle to the lateral edges of the band, and a groove in the face of each shoe extending transversely thereof from a forward corner to a rearward corner.

4. The combination with a brake band of spaced friction shoes each having an integral anchoring spur engaging a complementary opening in the band, and means in the working face of each shoe for causing lateral transmission of oil with relation to the shoe.

5. An approximately diamond shaped friction shoe having its ends disposed at an angle to its sides and a diagonally extending groove in the working face of said shoe.

In testimony whereof I affix my signature.

WILLIAM G. BARLOW.